Sept. 13, 1960

K. G. LYTTON ET AL 2,952,047

PICKER EVENER

Filed June 25, 1958

INVENTORS:
Kenneth G. Lytton,
Cecil S. Wise,
Charles A. Hendrix,
BY Cushman, Darby & Cushman
ATTORNEYS.

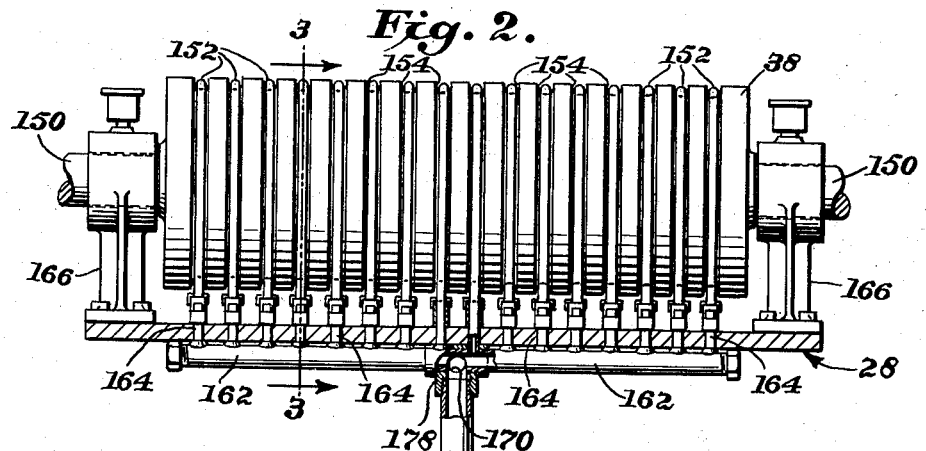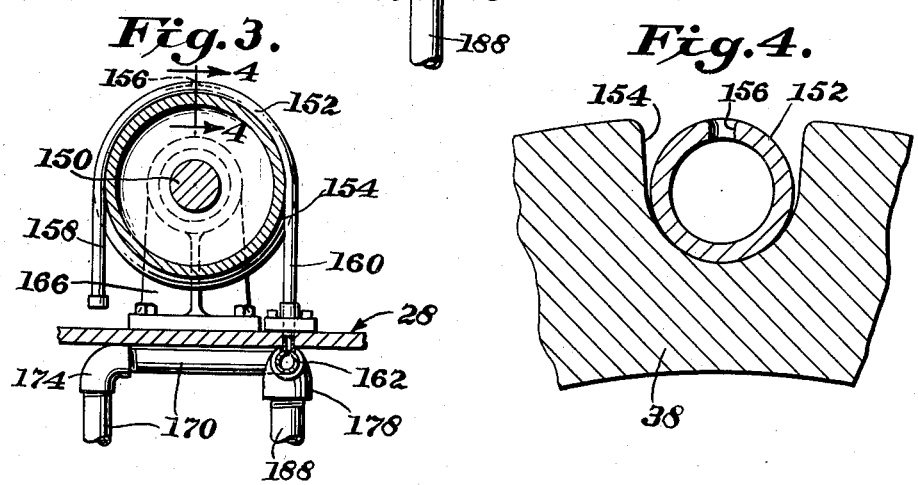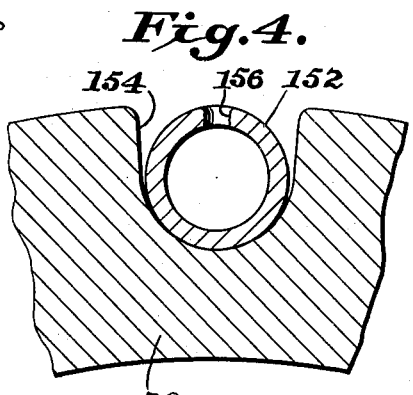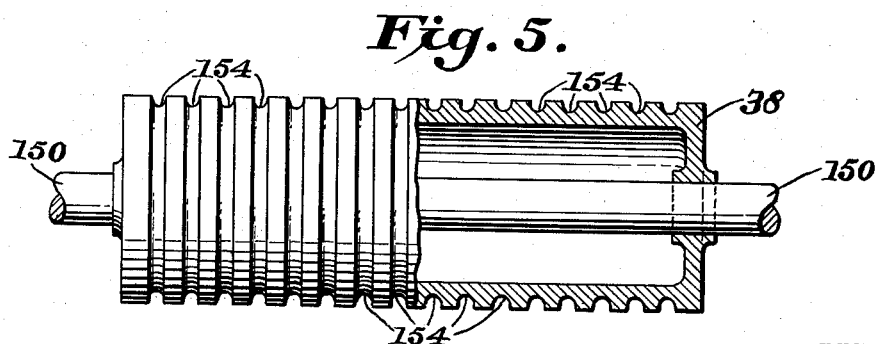

Sept. 13, 1960 K. G. LYTTON ET AL 2,952,047
PICKER EVENER
Filed June 25, 1958 5 Sheets-Sheet 3
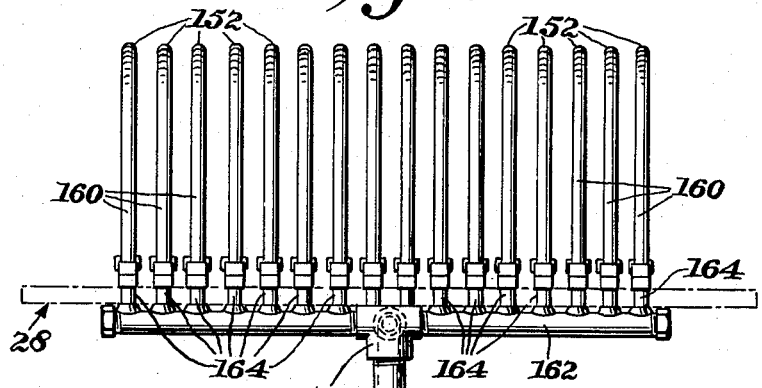
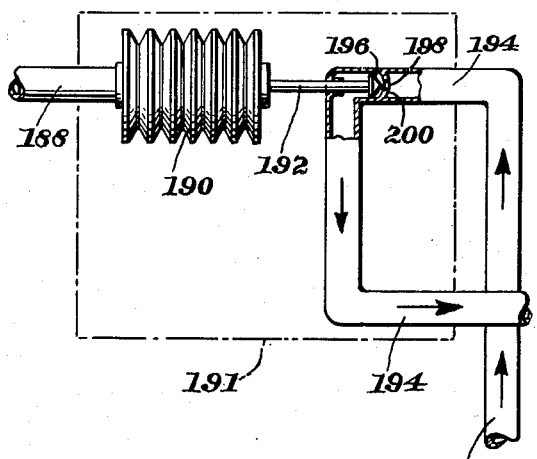
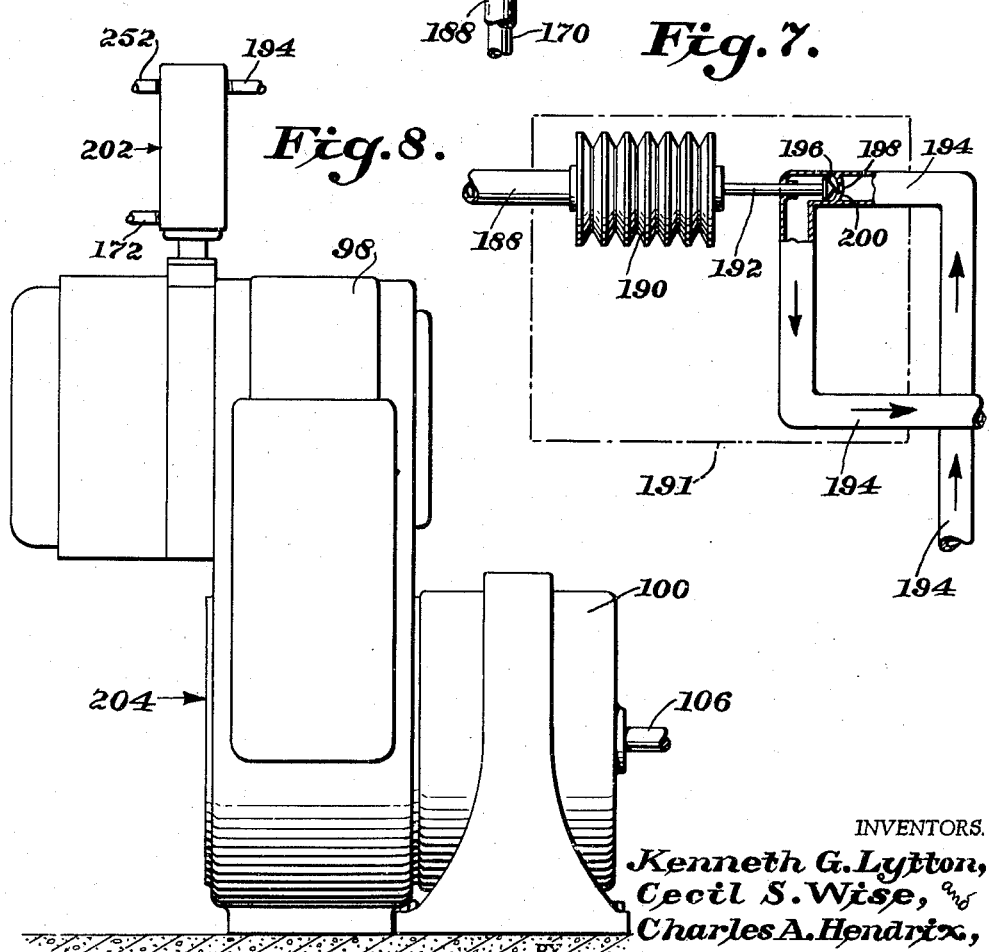
INVENTORS.
Kenneth G. Lytton,
Cecil S. Wise, and
Charles A. Hendrix,
BY Cushman, Darby & Cushman
ATTORNEYS.

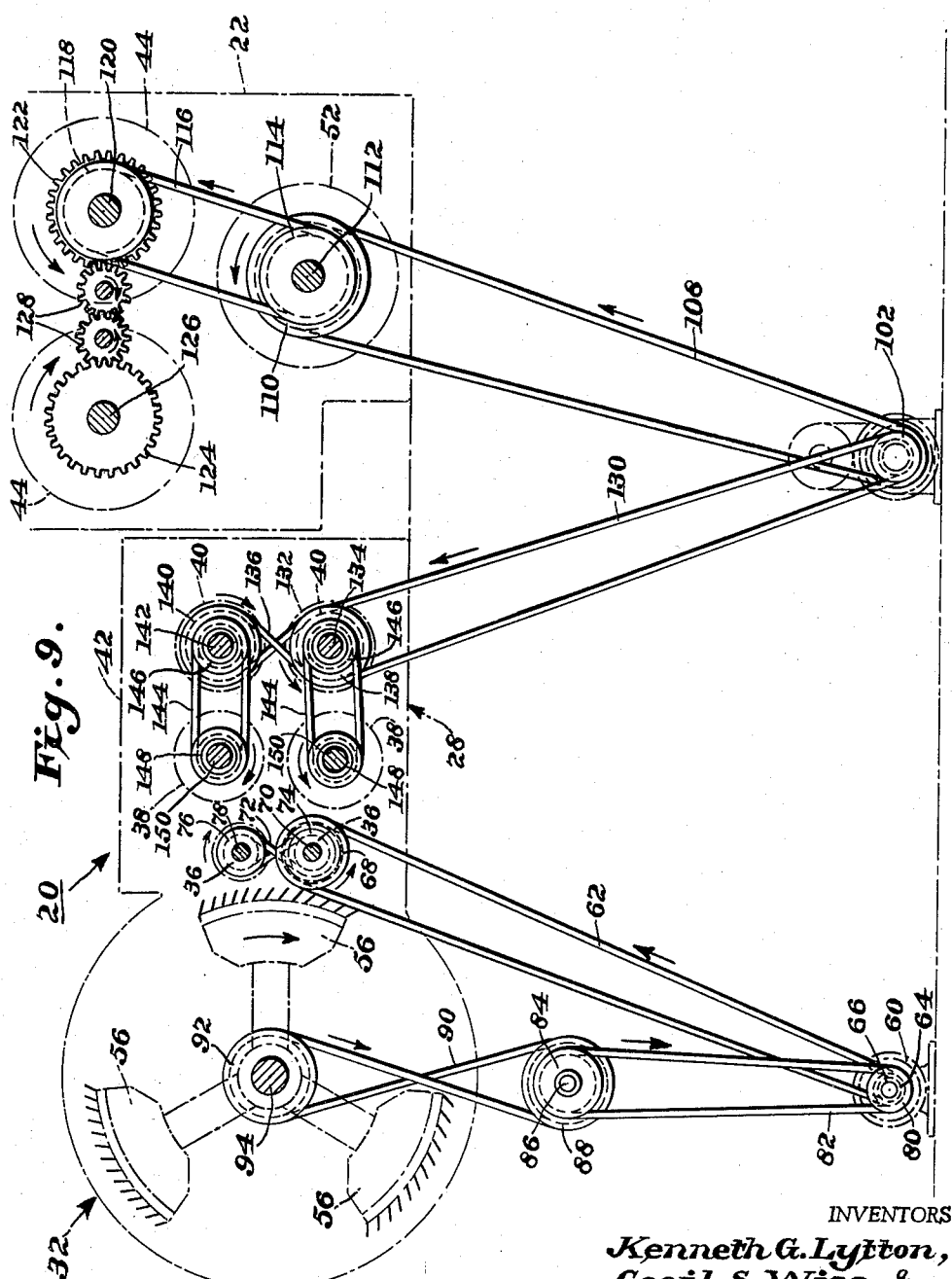

Sept. 13, 1960  K. G. LYTTON ET AL  2,952,047
PICKER EVENER
Filed June 25, 1958  5 Sheets-Sheet 5

INVENTORS:
Kenneth G. Lytton,
Cecil S. Wise,
Charles A. Hendrix,
BY Cushman, Darby & Cushman
ATTORNEYS.

United States Patent Office 2,952,047
Patented Sept. 13, 1960

2,952,047
PICKER EVENER

Kenneth G. Lytton, Gastonia, Cecil S. Wise, Dallas, and Charles A. Hendrix, Gastonia, N.C., assignors to Fiber Controls Corporation, Gastonia, N.C., a corporation of North Carolina Filed June 25, 1958, Ser. No. 744,547

8 Claims. (Cl. 19—70)

This invention relates to the art of processing cotton fiber. More particularly, it relates to cotton picking systems.

As is understood, cotton from the field is initially processed in a ginning machine to remove major portions of impurities, after which it is baled. This baled cotton still contains some impurities which have to be subsequently removed. The first stage in present processes is the opening and blending of the cotton from the bales, after which it passes through the usual cotton picking system, carding machines, etc., to be ultimately formed into the final product. The cotton fibers emerge from the cotton picking system in the form of a lap, and it is highly desirable that this lap be of uniform thickness in order to facilitate subsequent operations and to assure eveness of the final product.

Conventional cotton picking systems include a plurality of picker sections in series, each having a rotary beater and means for delivering the cotton from a holding chamber to the beater. Variations in the density of the cotton fed to the beater frequently occur due to one reason or another. These variations result in corresponding variation in the thickness and density of the lap leaving the beater. And as subsequent operations are performed on the lap to produce the sliver and thread, these variations in the lap thickness will result in inferior slivers and threads, unless compensated for, as by doubling.

There have been some previous attempts to eliminate the necessity of doubling to even the character of the resulting product by equipping pickers with evening devices in an effort to produce laps of uniform thickness. Such attempts are not believed to be entirely satisfactory, and it is an important object of the present invention to provide a novel and improved lap-evening means in cotton picking systems, particularly adapted to assure evenness and uniformity in the resulting lap.

It is another object of this invention to provide a novel arrangement of feed and delivery rolls between the holding chamber and the beater, in picker sections of the type referred to, whereby the speed of the delivery rolls is varied inversely in proportion to the density or thickness of the travelling cotton body that is delivered thereby to the feed rolls, which in turn feed the cotton to the beater. In the preferred form of the invention, the means utilized for effecting change in speed of the variable speed delivery rolls includes means for passing a stream of gaseous fluid under substantially constant pressure through the travelling cotton body.

A related and somewhat more specific object resides in the provision of means for rotating the feed rolls and the beater at constant speed, with the variable speed delivery rolls, and the point at which the density of the travelling cotton body is determined being located upstream from the feed rolls.

Still further objects of the invention reside in the provision of novel structures and arrangements thereof, in a cotton picking system, characterized by superior and improved performance.

Other objects and advantages of the invention will become evident from the following description and drawings, in which:

Figure 2 is a fragmentary and enlarged elevational view of a delivery roll in the picker section of Figure 1 and showing an exemplary construction of the means for passing a stream of fluid under pressure across the traveling cotton body;

Figure 3 is a sectional view taken generally along the line 3—3 of Figure 2;

Figure 4 is a fragmentary and enlarged sectional view taken generally along line 4—4 of Figure 3;

Figure 5 is a partially sectioned view of the delivery roll shown in Figure 2;

Figure 6 is an elevational view of the means shown in Figure 2 for passing a stream of fluid under pressure through the traveling cotton body;

Figure 7 is a fragmentary and enlarged view of an exemplary construction of a portion of the control arrangement for varying the speed of the delivery rolls;

Figure 8 is a fragmentary and enlarged side elevational view of a source of power and variable speed transmitting means for the delivery rolls;

Figure 9 is an elevational view of an exemplary arrangement for transmitting power to the various rotating bodies in the picker section of Figure 1;

As indicated heretofore, cotton picking systems usually are constructed in a plurality of picker sections arranged in series, wherein each section is provided with a rotary beater and means for feeding the cotton body thereto. In some cases, there may be involved a so-called "breaker section" and a so-called "finisher section," while in other cases, a third section may be positioned intermediate the breaker and finisher sections. In any case, the cotton is first fed to the breaker section and then ultimately to the finisher section, after which it is delivered as a web, in known manner, to winding rolls for subsequent known operations to form the final thread product.

The invention is particularly concerned with the provision of a novel evening arrangement in the finisher section, and will be illustrated and described in connection therewith. However, inasmuch as the various picker sections may be of generally similar constructions, it will be appreciated that the invention is not necessarily limited to application in the finisher section but may be provided in other sections of the cotton picking system, if desired.

In one aspect, the present invention contemplates a cotton picking system having a pair of feed rolls adjacent a beater for feeding a body of fiber thereto, with means for continuously delivery the cotton or fiber body to the feed rolls at a rate varying inversely with the variations in the density of the fiber body measured at a point upstream from the rolls. The means for continuously deliverying a fiber body to the feed rolls preferably includes a pair of variable speed delivery rolls upstream from the feed rolls with means for passing a stream of fluid under pressure through the fiber body passing between the delivery rolls, and means responsive to the resistance to the flow of this stream of gas presented by the fiber body to vary the speed of the delivery rolls.

In another aspect, it is contemplated by the invention that the beater and feed rolls positioned upstream therefrom rotate at constant speed.

Other and more specific aspects of the invention will be evident as the description proceeds.

Figure 1:
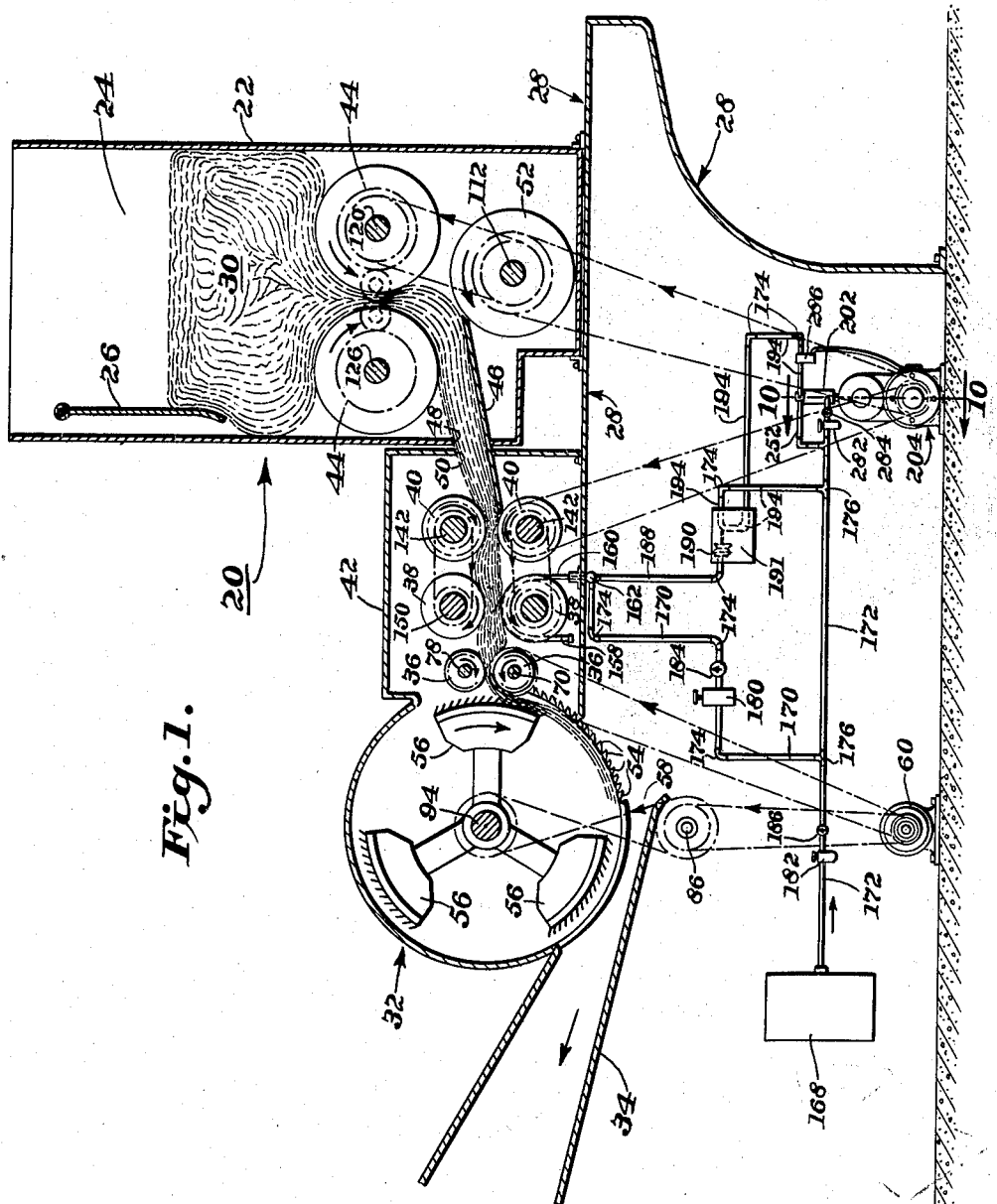
Figure 1 is a longitudinal and vertical sectional view of a picker section of a cotton picking system embodying the invention.

Referring now to the drawings, a finisher picker section, as best seen in Figure 1, is indicated generally by numeral 20. As illustrated, it includes a suitable hopper or container 22 defining a cotton receiving and holding chamber 24. Chamber 24 may be opened at its upper end, as shown, for communication, for example, with the discharge of another picker section, such as a breaker or intermediate section (not shown). As will be understood, cotton is fed into chamber 24 from the previous section by any appropriate means (not shown). And, if desired, suitable feeler means, such as swingable member 26, may be provided in chamber 24 to discontinue the feeding of cotton when the chamber is filled to a predetermined extent, in known manner.

The hopper 22 may be supported in any suitable structure, as by the frame 28 shown. The cotton 30 in the hopper will be fed as a traveling web by means, to be described in detail hereinbelow, to a beater 32. The beater may be of any conventional form, constructed and arranged in known manner, and suitable doffing means, such as a blast of air, may be provided for conveying the cotton from the beater 32 through a chute 34. As is understood, the cotton may pass from the chute 34 to a condenser (not shown) and then to a calender head (not shown) for subsequent delivery to winding rolls (not shown) for collecting the cotton in lap form on these rolls. The condenser, calender head and winding rolls may be of any appropriate construction.

Referring now to the illustrative arrangement of the means for feeding the cotton from the hopper 22 to the beater 32, it will be seen that there is provided a pair of feed rolls 36 positioned adjacent to the beater 32, and a pair of delivery rolls 38 positioned upstream from the feed rolls 36 for delivering the fiber body thereto. Another pair of delivery rolls 40 is provided next to the rolls 38, as shown, and all of these rolls 36, 38, 40 may be arranged in the positions shown in a housing 42 suitably supported on the frame 28, as illustrated.

A pair of rolls 44 is mounted in the hopper 22, as shown, for feeding the cotton 30 as a traveling web onto a chute or guide 46 extending from a position under the rolls 44 through openings 48, 50 respectively in the adjacent walls of the hopper 22 and housing 42, as shown, whereby the cotton will be directed into the nip of the rolls 40. A third roll 52 is provided adjacent the bottom of the hopper 22 to direct the cotton onto the chute 46. As will be evident, cotton will first pass from the hopper through the rolls 44, which will effect an initial pressing thereof, through the openings 48, 50 and then successively through the rolls 40, 38, 36 to be picked up by the blades on the beater 32. It will be understood that the beater may be constructed with the usual grid bars 54 arranged along an arcuate path, as shown, for cooperation with the blades of the rotating sections 56 of the beater to remove impurities. The doffing blast of air, referred to hereinabove, may be introduced in the vicinity of the region identified by numeral 58 and flow upwardly in the direction of inclination of chute 34 to remove the cotton from the blades of the beater sections 56 and deliver it to the condenser.

In accordance with the invention, and as previously indicated, the feed rolls 36 and beater 32 are constructed and arranged to be driven at a constant speed, while the various delivery rolls 38, 40, 44 and 52 are constructed and arranged to be driven at a speed varying inversely with the density of the web of cotton traveling to the feed rolls 36. For this latter purpose, means are provided for determining the density of the traveling web of cotton at a point upstream from the feed rolls 36 and for effecting variations in the speed of the delivery rolls in inverse relation to the density of the cotton at the point of determination.

In the illustrative embodiment of the invention, a first prime mover 60 (see Figures 1 and 9) is provided for rotating the beater 32 and rolls 36 at the constant speed referred to. The means for transmitting power from the prime mover 60 to the rolls 36 and beater 32 may include pulleys and belts, as best seen in Figure 9. As there shown, a belt 62 is engaged to a pulley 64 on the take-off shaft 66 of the prime mover 60, and is also engaged to a pulley 68 on the shaft 70 of the lower of rolls 36. Another belt 72 is engaged to pulleys 74, 76 on the shafts 70, 78 of rolls 36 in the manner shown to provide for rotation of these rolls in the desired direction. Another pulley 80 is provided on the prime mover take-off shaft 66 and is engaged to a belt 82 which also engages an upper pulley 84 mounted on shaft 86, supported in this position by suitable structure (not shown). Also mounted on shaft 86 is pulley 88 with a belt 90 extending around this pulley and the pulley 92 mounted on shaft 94 of the beater 32. Belt 90 will be arranged in the form of a figure 8, as is the case of belt 72, to effect rotation of the beater in the desired direction.

Figure 10:
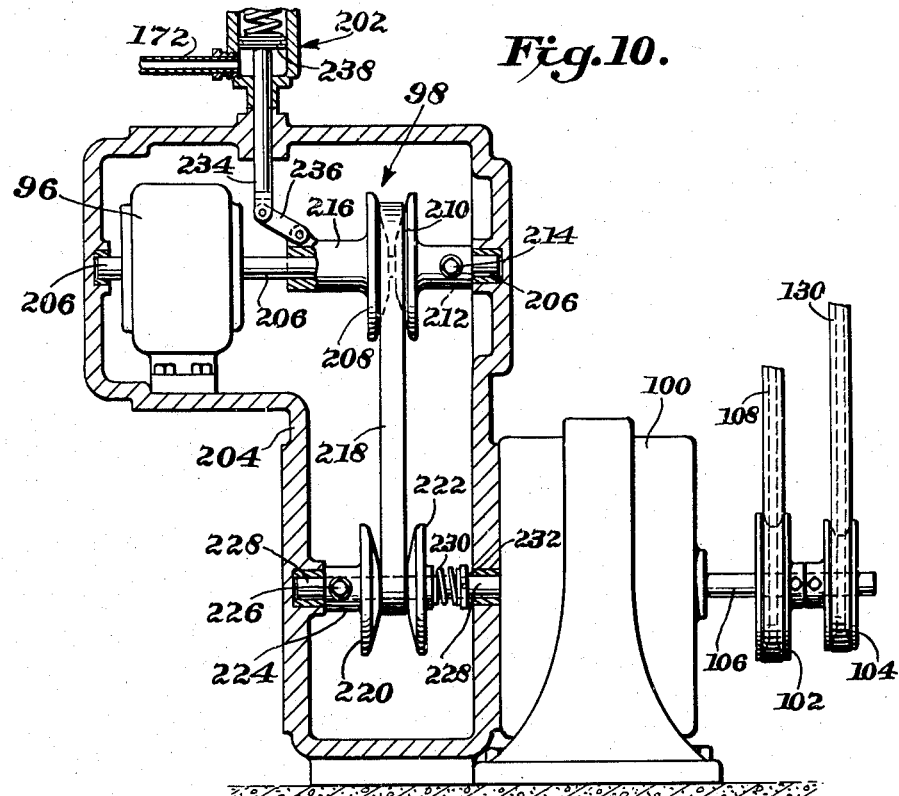
Figure 10 is an enlarged fragmentary sectional view taken generally along line 10—10 of Figure 1.

Another prime mover 96 is provided in the illustrative embodiment, as best seen in Figure 10, for driving the rolls 38, 40, 44 and 52. Once again, the means for drivingly connecting these rolls to the prime mover 96 may take any desired form, and include a pulley and belt arrangement, as indicated. However, it is contemplated that a variable speed transmitting arrangement, generally indicated by numeral 98 in Figure 10, and a conventional speed changing device 100 be interposed between the prime mover 96 and the pulley and belt arrangement, as will be set out in more detail hereinbelow. The pulley and belt arrangement, as best seen in Figures 9 and 10, includes a pair of pulleys 102, 104 fixed to a take-off shaft 106 extending outwardly from the speed changing device 100. A belt 108 extends from pulley 102 to a pulley 110 on the shaft 112 for roll 52. Another pulley 114 is fixed to the shaft 112, and a belt 116 extends around this pulley, and a pulley 118 fixed to the shaft 120 of the roll 44, as shown in Figure 9.

A gear train is shown in Figure 9 for transmitting power between the rolls 44, and includes a spur gear 122 on the shaft 120 and another spur gear 124 on the shaft 126 of the other roll, with two idler gears 128 provided therebetween whereby the rolls will rotate in the direction indicated.

A belt 130 extends around the other pulley 104 on shaft 106 and is engaged to a pulley 132 fixed to a shaft 134 on the lower of rolls 40. A belt 136 is trained around a pulley 138 on shaft 134 and pulley 140 on shaft 142 for the upper of rolls 40, as shown. And the rolls 40 are drivingly connected to the rolls 38 by means of the belts 144 extending around pulleys 146 on the shafts 134, 142 and the pulleys 148 on shafts 150 of rolls 38, as shown.

It will be understood that the various shafts of the rotating bodies in the picker section 20 may be journalled by any appropriate structure in the positions shown.

As previously indicated, the preferred form of the invention contemplates that means be provided operatively associated with the rolls 38 for directing a stream of fluid under pressure between these rolls and through the web of cotton traveling therebetween. As the density of the web of cotton varies, the resistance presented thereby to this stream of fluid under pressure will be correspondingly varied. And means are provided for detecting these changes in resistance to the flow of the stream of fluid under pressure for automatically operating the variable speed transmitting means 98 to effect a change in the speed of the delivery rolls 38, 40, 44 and 52. This means is so constructed and arranged that as the density of the traveling web of cotton increases, thus increasing its resistance to the flow of fluid under pressure referred to, the speed of the delivery rolls will be decreased; while if the density of the traveling web decreases, the speed of these rolls will be increased.

Referring now to Figures 1 through 6, the means associated with the rolls 38 for directing a stream of pressurized fluid therebetween is illustrated as including a plurality of arcuate conduit sections 152 disposed in axially-spaced, circumferential grooves 154 formed in the lower of rolls 38, as best seen in Figures 2–5. These arcuate conduit sections are of semi-circular form, disposed in the upper half of the grooves 154 and they lie wholly within the outer face of the roll 38, as best seen in Figures 2 and 4. In other words, these conduit sections 152 do not project outwardly of the external cylindrical surface of the roll. To minimize friction, the conduit sections 152 may be spaced out of contact with the surface of grooves 154 to provide a clearance therebetween. As shown in Figures 3 and 4, an outlet aperture 156 is formed in each conduit section 152.

Straight portions 158, 160 depend tangentially from the arcuate conduit sections 152, the former being sealed at their lower ends, while the latter communicate at their lower ends with a manifold pipe 162, such as by the connecting tubular members 164 engaged in appropriate fluid-tight joints to the manifold pipe 162 and the lower open end of the conduit portions 160, as best seen in Figures 2, 3 and 6. These members 164 are shown to extend through the frame wall 28, and this wall may mount supports 166 to which the shaft 150 of the lower roll 38 may be journalled.

As best seen in Figures 1, 2, 3 and 6, manifold pipe 162 is sealed at its ends and communicates with an appropriate source of fluid pressure, indicated schematically at 168, as by the conduit 170 connecting into the manifold 162 at one end, and at the other end connecting into a conduit 172 extending from the source of fluid pressure 168.

Elbow joints 174 may be provided in the conduit 170, as shown, with a T-fitting 176 connecting the conduits 170, 172. A fitting 178 is shown in the manifold 162, as seen in Figures 2 and 3, into which the conduit 170 opens. Pressure regulators 180, 182 and gauges 184, 186 are respectively provided in conduits 170, 172 (see Figure 1), whereby the pressures in these conduits can be held at substantially constant values.

Another conduit 188 is connected to the fitting 178 and communicates with the manifold. This latter conduit extends to an appropriate device for converting pressure variations in the conduit sections 152 and manifold 162 into a signal which will automatically operate the variable speed transmitting device 98 to effect an appropriate change in speed of the delivery rolls 38, 40, 44 and 52.

In the illustrative embodiment, the conduit 188 opens into an expansible bellows 190 (see Figure 7) arranged, for example, in a housing 191. A rod 192 is shown on the other end of the bellows extending into a conduit 194 and carrying a conical valve member 196 at its free end. The valve 196 is adapted to regulate the fluid flow through an orifice 198 provided in a wall 200 in conduit 194 adjacent valve 196, as shown. The conduit 194 communicates at one end with the main conduit 172, and at the other end with a controller positioner 202 for the variable speed transmitting device 98. Appropriate elbow joints 174 and T-fitting 176 may be utilized for conduits 188 and 194, as shown.

Figure 11:
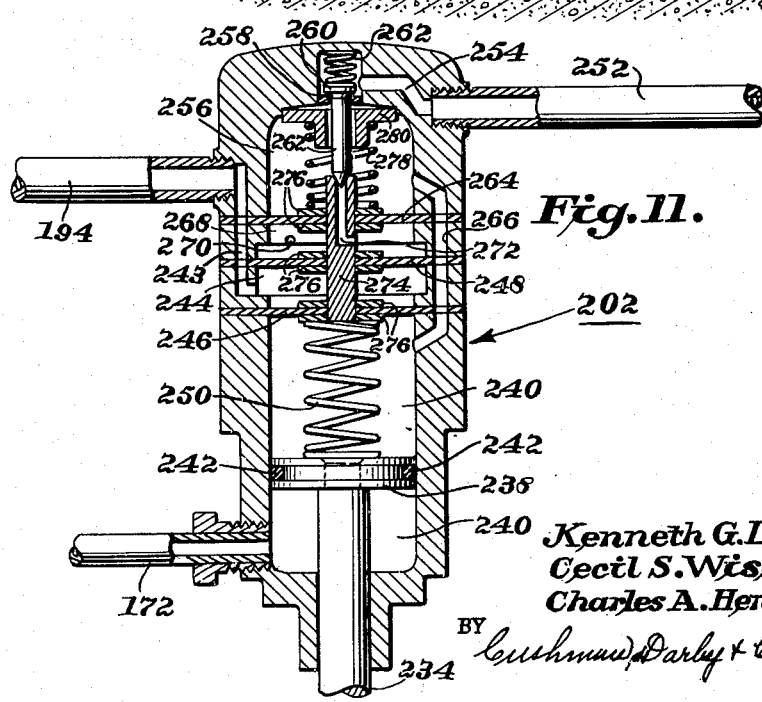
Figure 11 is an enlarged fragmentary sectional view also taken generally along line 10—10 of Figure 1 and showing an exemplary arrangement of a portion of the variable speed transmitting arrangement.

The structure and operation of the variable speed transmitting device 98 and positioner 202 may be that shown in Figures 10 and 11 and now to be described; although such structures, per se, do not form any part of the present invention. They are merely illustrative of one type of arrangement that may be utilized in combination with the aforedescribed fluid conduit organization for converting variations in the density of the traveling web of cotton, detected upstream from feed rolls 36, into changes of speed in the delivery rolls 38, 40, 44 and 52.

As best seen in Figure 10, the variable speed transmitting device 98 is arranged in a housing 204. The prime mover 96 is located in the upper portion of this housing and is provided with a shaft 206 suitably journalled at its ends in the side walls of the housing, as shown. A first pulley half 208 is drivingly connected to the shaft 206 but is axially movable thereon. A second pulley half 210 having a hub 212 is affixed to the shaft 206 as by set screw 214. A collar 216 is slidably mounted on shaft 206, pressing against the pulley half 208, and connected to the positioner 202, as will be described more fully hereinbelow, to vary the axial position of pulley half 208 on shaft 206 and relative to pulley half 210.

A belt 218 is trained around the pulley halves 208, 210 and also around a second pair of pulley halves 220, 222 in the bottom of the housing 204. Pulley half 220 and its hub 224 are fixed, as by set screws 226, to a shaft 228 suitably journalled in the housing side walls and extending into the speed changing device 100. The other pulley half 222 is drivingly connected to the shaft 228 but is axially slidable thereon. A compression spring 230 encircles the shaft 228 and abuts against the pulley half 222 at one end, and at the other end against a collar 232 affixed to the shaft.

Referring to the positioner 202, a piston rod 234 extends through the bottom wall of the positioner and the top wall of the housing and is connected at its lower end to the collar 216 as by a link 236 pivotally engaged at its ends to the collar and rod. A piston 238 is fixed to the top of the rod 234 and is reciprocable in the chamber 240 in the positioner to vertically reciprocate the rod 234. An O ring 242 may be provided around the piston in engagement with the side walls of chamber 240, as shown.

The vertical position of piston 238 and rod 234 determines the amount of separation between the pulley halves 208, 210 through its connection to the collar 216 and the action of the compression spring 230. Thus, as the piston moves up the pulley halves 208, 210 will be free to be separated to a greater extent as pulley half 222 is moved closer to pulley half 220, by spring 230, thereby disposing the belt 218 closer to the shaft 206 and farther away from the shaft 228 whereby the speed of shaft 228 will be decreased. Conversely, movement of the piston 238 downwardly will cause the pulley half 208 to be moved closer to pulley half 210 which in turn will cause an increase in the separation of the pulley halves 220, 222 and an increase in the speed of shaft 228.

The vertical position of the piston 238 and rod 234 is determined by the pressure in the conduit 194, such pressure being hereinafter referred to as the "signal pressure" or "signal air." As previously indicated, this conduit is connected at one end to the positioner 202, as seen in Figures 8 and 11, and it communicates through passageway 243 with a chamber 244 in the positioner, formed above chamber 240 by diaphragms 246, 248. The main conduit 172 communicates with the lower part of chamber 240, underneath the piston 238, and the fluid pressure introduced thereby into chamber 240 will be hereinafter referred to as "cushion pressure" or "cushion air." A compression spring 250 is positioned in the chamber 240 between the diaphragm 246 and piston 238, as shown.

As seen in Figure 1, a conduit section 252 branches off the main conduit 172 and opens into a passageway 254 in the positioner 202, as seen in Figure 11, the fluid pressure provided to this passageway 254 being hereinafter referred to as the "power pressure" or "power air." Passageway 254 communicates with a chamber 256 in the positioner through a centrally apertured plate 258, A movable pilot valve member 260 is urged by compression spring 262 into a position closing the aperture in the plate 258, as shown.

The bottom of chamber 256 is defined by a third diaphragm 264, and a passageway 266 is formed in the positioner establishing communication between the chambers 256 and 240, as indicated. Another chamber 268 is formed in the positioner between the diaphragms 248, 264, this chamber being vented to the atmosphere such as through opening 270 in the positioner wall, and being adapted to be placed in communication with chamber 256 through a passageway 272 in an exhaust valve member 274. This member 274 is fixedly engaged to the diaphragms 246, 248, 264 and is movable therewith. Disc-like elements 276 may be engaged to the diaphragms and member 274, as shown. The upper end of the passageway 272 is formed as a valve seat to receive the conical lower end of the pilot valve member 260. A compression spring 278 is provided in chamber 256 between the diaphragm 264 and a member 280 resting against the top wall of this chamber, as shown.

In a proposed arrangement, air under a pressure of approximately 40 p.s.i.g. is supplied from source 168 to the conduit 172. Pressure regulator 182 reduces this pressure to approximately 30 p.s.i.g. while pressure regulator 180 in conduit 170 reduces the pressure in this conduit to approximatley 2 p.s.i.g. which is then the approximate pressure of the air in the arcuate conduit sections 152 for discharge through the apertures 156. Another pressure regulator 282 is provided in the main conduit 172, downstream from the point of connection to the branch conduit 252 for further reduction of the pressure in this line to approximately 20 p.s.i.g. which will then be the pressure of the cushion air underneath the piston 238, while the pressure of the power air in conduit 252 will be approximately 30 p.s.i.g. Gauge 284 may be provided adjacent regulator 282.

In the operation of the system of the invention, pressurized air will be discharged continuously from the apertures 156 in the conduit sections 152, flowing upwardly between the delivery rolls 38 and through the traveling web of cotton 30. As the resistance presented by the traveling web to this flow of air varies, the pressure in the manifold 162 will be varied to change the pressure existing in conduit 188. As this latter pressure varies, it will effect a movement of the expansible and collapsible bellows 190 to change the position of the valve 196 with respect to the adjacent orifice 198. Movement of valve member 192 will thus effect a change in the pressure of the signal air delivered by conduit 194 to the chamber 244 in positioner 202 within the range of about 3 to 15 p.s.i.g.

Referring to Figures 7, 10 and 11, as the valve member 192 moves away from the orifice 198 in response to a decrease in the flow resistance presented by the traveling web of cotton at rolls 38 to the air issuing from conduits 152, the signal pressure in the conduit 194 delivered to chamber 244 will increase. This increase in pressure in chamber 244 will effect an upward deflection of the diaphragms 246, 248 and valve member 274 so that the latter will engage and move pilot valve member 260 upwardly and thus open the aperture in plate 258 thereby enabling power air to flow through passageway 254 into the chamber 256. This power air then flows through passageway 266 into the upper part of chamber 240 and urges the piston 238 and rod 234 downwardly.

As previously indicated, such downward movement of the rod 234 causes the pulley halves 208, 210 to be moved closer together whereby the belt 218 will rise or move radially outwardly on these pulley halves, thus causing the other pulley halves 220, 222 to be moved farther apart, thereby increasing the speed of rotation of the shaft 228 and pulleys 102, 104 to increase the speed of rotation of the delivery rolls 38, 40, 44 and 52 and increase the amount of cotton delivered to the feed rolls 36. Thus, a decrease in the resistance of the cotton to the flow of air therethrough at rolls 38, indicating a decrease in the density of the cotton, will result in an increase in the amount of cotton fed to rolls 36 and beater 32.

It should be noted that more of diaphragm 248 is exposed to the air in chamber 244 than diaphragm 246, as shown; hence, when the signal air pressure in this chamber increases, the differential pressure acting upwardly on diaphragm 248 will raise the diaphragms and member 274.

As the piston 238 is moved downwardly under the influence of power air, the force of the spring 250 on the diaphragm 246 will be reduced, whereby this diaphragm will be slightly lowered, resulting in a lowering of member 274 to open the exhaust valve at its upper end causing some of the power air in chamber 256 to be bled to the atmosphere through the passageway 272, chamber 268, and vent 270. A throttling of the pilot valve at plate 258, and the exhaust valve takes place until a balanced state exists for the signal pressure in chamber 244.

If the resistance of the traveling web of cotton to the flow of air therethrough issuing from the apertures 156 is increased, indicating an increase in the density of the traveling web, the pressure in the manifold 162 will be increased, which in turn will cause an expansion of the bellows 190 through the conduit 188. Valve 196 will move toward orifice 198 to decrease the pressure of the signal air flowing into chamber 244. This decrease of pressure in the chamber 244 will cause compression spring 278 to move diaphragm 264 and member 274 downwardly to open the exhaust valve. Pilot valve member will then close plate 258 whereby power air from chamber 256 will be exhausted to the atmosphere through passageway 272, chamber 268 and vent 270. The resulting reduction in pressure in chambers 240, 256 causes the cushion air underneath the piston 238 to move it and rod 234 upwardly, effecting a decrease in the speed of shaft 228, as previously described. This decrease in speed produces a similar decrease in the speed of the delivery rolls 38, 40, 44 and 52 to decrease the amount of cotton delivered to the feed rolls 36.

When the piston 238 moves upwardly under the action of the cushion air, springs 250, 278 are compressed, and a throttling of pilot valve member 260 and exhaust valve member 274 takes place until a balanced throttled condition is reached corresponding to the new signal pressure in chamber 244.

It might be noted that when the positioner 202 reaches a new balanced and throttled condition in response to a change in the pressure of the signal air, a small bleed of power air will be exhausted from the positioner through vent 270 for continuous balance of forces therewithin.

Thus, it will be seen that the relationship provided between the signal pressure, determined by the density of the traveling cotton web, and the speed of the delivery rolls will be effective to yield a uniform feed of cotton to the feed rolls 36 and beater 32.

A solenoid valve 286 may be provided in the signal pressure conduit 194 to slow down or shut off the motor 96 when the cotton picking system is not operating.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

We claim:

1. In a cotton picking system, a beater, and means for feeding a fiber body to said beater, said means including: a pair of rolls adjacent said beater; and means for continuously delivering a fiber body to said rolls at a rate varying inversely with the variations in the density of the fiber body measured at a point upstream from said rolls, said last-named means comprising a second pair of rolls for feeding a fiber body to said first-named pair of rolls and fluid-pressure actuated means controlling the speed of said second pair of rolls in response to variations in the density of the fiber body passing therebetween, said fluid-pressure actuated means being defined by a source of fluid pressure and means operatively associated with said source and said second pair of rolls for directing a stream of fluid under pressure in a radial direction between the two rolls in said second pair.

2. In a cotton picking system, a beater, a pair of feed rolls adjacent said beater for feeding a fiber body thereto, means for rotating said feed rolls and said beater at constant speed, a pair of delivery rolls upstream from said feed rolls for delivering a fiber body thereto, and means for varying the speed of said delivery rolls in response to variations in a condition of the fiber body passing therebetween, said last-named means including means for directing a stream of fluid under pressure transversely through the fiber body upstream of said feed rolls.

3. The structure defined in claim 2 wherein said means for directing a stream of fluid under pressure is operatively engaged to one of said delivery rolls for creating a transverse flow of gaseous fluid under substantially constant pressure between said latter rolls.

4. In a cotton picking system, a rotary beater, a pair of feed rolls positioned adjacent said beater and adapted to feed a fiber body thereto, a first rotary driving means operatively connected to said beater and said rolls for driving them at constant speed, a pair of delivery rolls arranged upstream from said feed rolls and adapted to feed a fiber body thereto, a second rotary driving means operatively connected to said delivery rolls, and fluid pressure actuated means comprising means for directing a stream of fluid under pressure transversely through the fiber body upstream of said feed rolls, said fluid-pressure actuated means operating to control the speed of said second driving means in response to variations in the density of the fiber body passing through said delivery rolls.

5. The structure defined in claim 4 wherein said means for directing a stream of fluid under pressure is operatively engaged to one of said delivery rolls for directing a stream of fluid under pressure toward the other of said delivery rolls.

6. The structure defined in claim 5 wherein said one of said delivery rolls includes a plurality of axially-spaced circumferential grooves, and further wherein said means operatively engaged to said latter roll includes: an arcuate conduit section disposed within each of said grooves inwardly of the outer face of said latter roll, a source of pressurized fluid for said conduit sections, and each of said sections having an aperture therein arranged at the region where the fiber body is engaged by said delivery rolls.

7. In a cotton picking system, a hopper containing a mass of cotton, a pair of delivery rolls adjacent the bottom of said hopper, means in said hopper for removing the cotton therefrom and delivering it in a web to said rolls, a pair of feed rolls positioned downstream from and adjacent to said delivery rolls to receive the web of cotton discharging therefrom, a rotary beater positioned downstream from and adjacent to said feed rolls for receiving the web of cotton discharging therefrom, first means for rotating said beater and said feed rolls at constant speed, and second means for rotating said delivery rolls at a speed varying inversely with the density of the web of cotton passing between said latter rolls, said second means including a source of power, a variable speed transmission arrangement connecting said source of power to said delivery rolls; means for delivering a jet of gas under pressure transversely through the web of cotton in the region of said latter rolls; and means responsive to the resistance of the web of cotton to the flow of this gas therethrough to alter said transmission arrangement so that the speed of said latter rolls varies inversely with variations in the resistance of the web of cotton to flow of gas therethrough.

8. The structure defined in claim 7 wherein one of said delivery rolls is formed with a plurality of axially-spaced circumferential grooves in the outer surface thereof, and further wherein said means for delivering a jet of gas includes a plurality of arcuate conduit sections arranged in said grooves to lie wholly within the outer surface of said one roll, said conduit sections each being provided with a discharge aperture opening radially outwardly to direct a flow of gas from said conduit sections toward the other of said delivery rolls.

References Cited in the file of this patent

UNITED STATES PATENTS

| | | |
|---|---|---|
| 2,057,641 | Curley et al. | Oct. 13, 1936 |
| 2,843,882 | Lewis et al. | July 22, 1958 |

FOREIGN PATENTS

| | | |
|---|---|---|
| 284,356 | Switzerland | Nov. 17, 1952 |